…

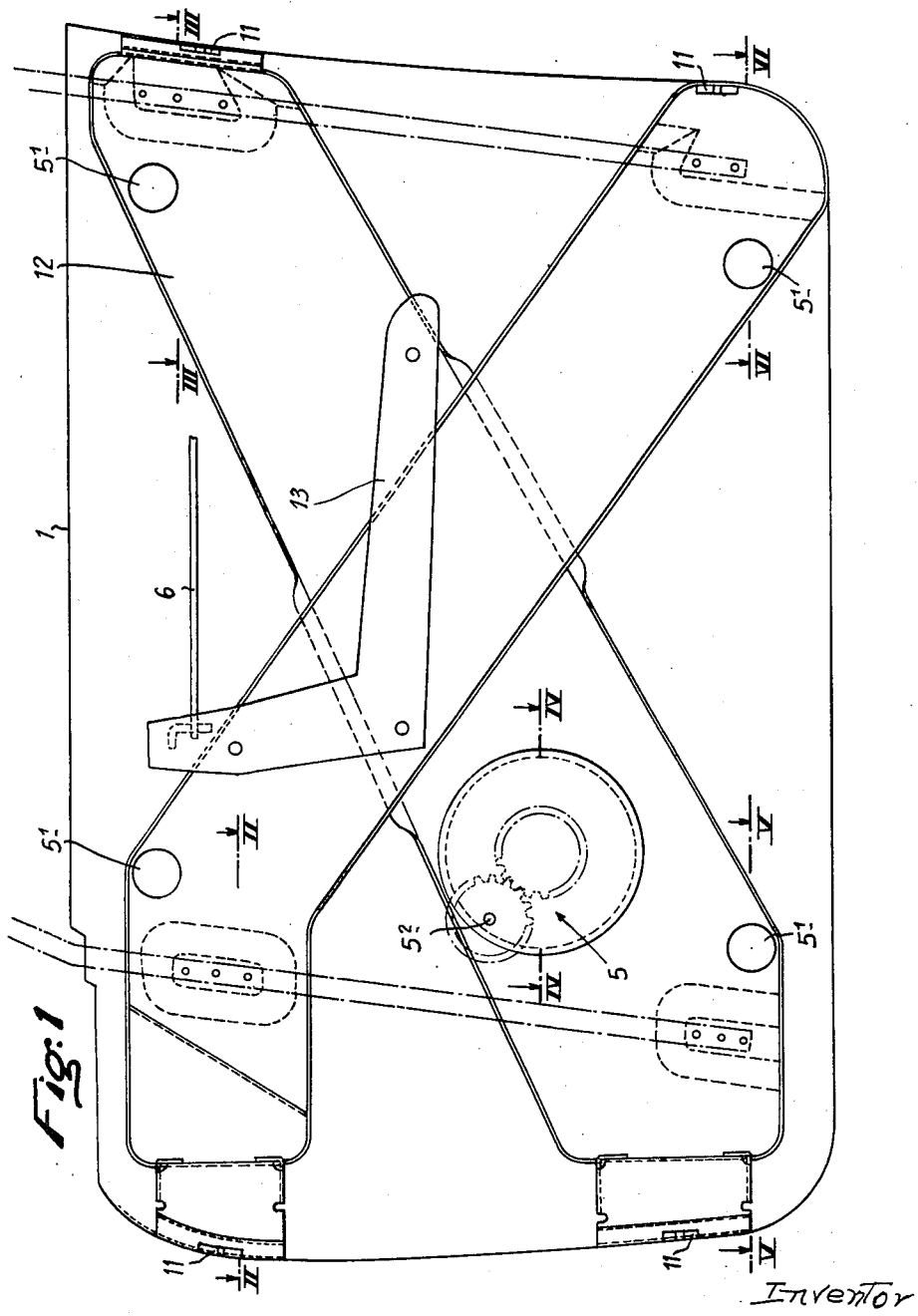

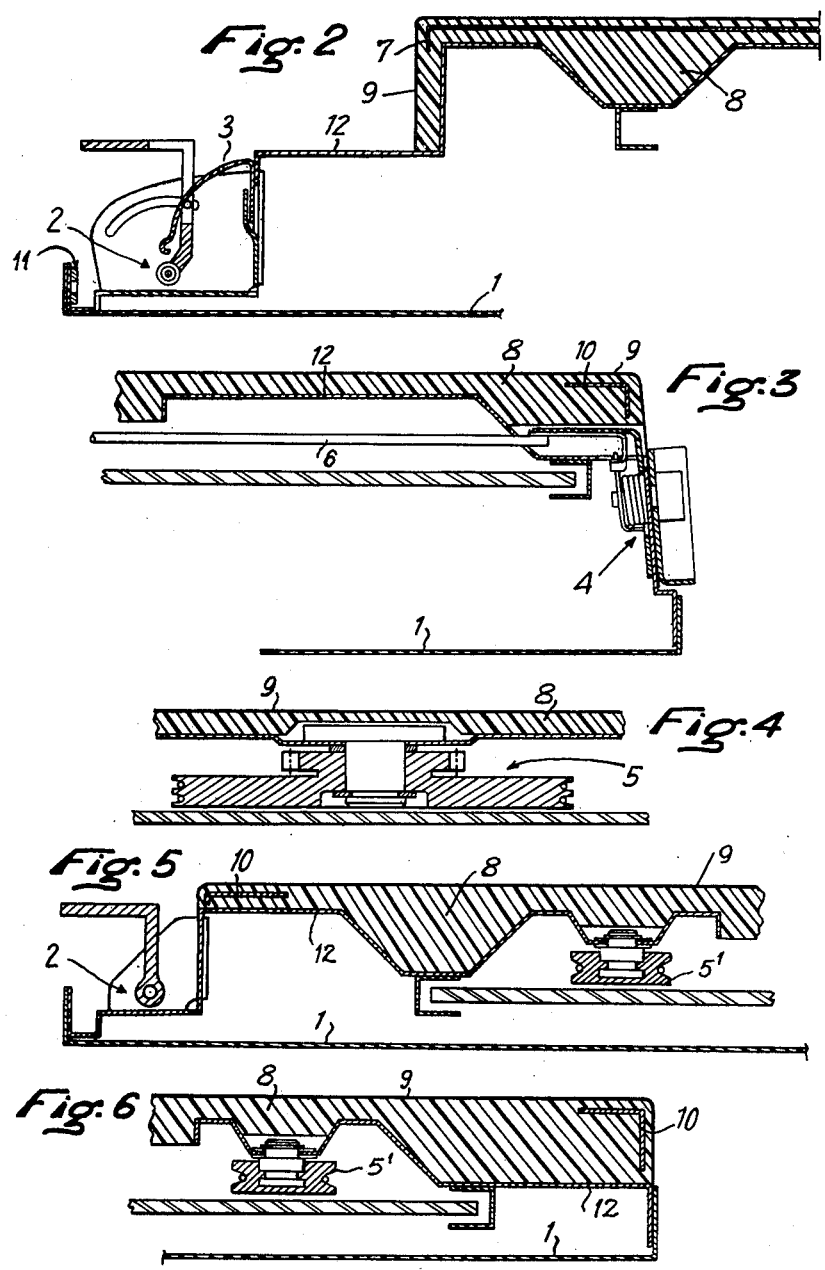

United States Patent Office 3,258,877
Patented July 5, 1966

3,258,877
CONSTRUCTION OF PANELS, NOTABLY OF
DOORS FOR AUTOMOBILE VEHICLES
Lucien Péras, Billancourt, France, assignor to Regie Nationale des Usines Renault, Billancourt, France
Filed Mar. 16, 1964, Ser. No. 352,172
Claims priority, application France, Mar. 22, 1963,
929,000, Patent 1,359,917
5 Claims. (Cl. 49—502)

This invention relates to the manufacture of mechanical parts and more particularly to the construction of doors for automobile vehicles, wherein the advantages of mechanical parts, such as rigidity, clean appearance of surfaces, ease of assembling and mounting, etc. are combined with those of plastic components such as heat and sound insulation, light weight, resistance to corrosion, etc. while remaining within reasonable limits from the economical point of view.

This invention is concerned more particularly with the construction of a panel consisting of the association which said panel is adapted to be fitted somewhat in the fashion of a lid, this assembly consisting of an inner metal structure coated with plastic or any other suitable material adapted to be moulded or pressed, such as cardboard.

This coating preferably moulded over the metal structure constitutes the inner wall of the door and, at the same time, the upholstery and the finishing or ornamental "skin" or lining of the panel.

The metal structure consisting either of two relatively thick X-forming sheet-metal strips welded together, or of a single aluminium or light-alloy casting constitutes the support of all the conventional mechanisms carried by the element and adapted to be mounted in said X-shaped sheet-metal or aluminium casting prior to its assembling with the thin sheet-metal panel, but if desired subsequent to the application of its plastic coating.

This invention applies not only to doors of automobile vehicles but also to any other parts of automobile coachwork such as, tail-gate bonnet, instrument panel, etc., as well as to any other pressed or cast construction elements for a large number of other articles such as refrigerators, etc.

A door of automobile vehicle constructed according to the teachings of this invention will now be described by way of example with reference to the accompanying drawings, in which:

FIGURE 1 is an elevational view from inside of a door without its lining; and

FIGURES 2 to 6 are sections taken upon the lines II—II to VI—VI of FIGURE 1.

This door consists of an external sheet-metal panel 1 of vary reduced thickness (for example of the order of 0.235″ to 0.275″ (0.6 to 0.7 mm.) with flanged edges, fitting in the manner of a lid on the inner assembly comprising the following component elements:

(1) An inner metal structure 12 consisting of a pair of X-forming metal sheets of greater thickness (for example 1/16″) welded together and shaped to constitute the support and base-plate of all the mechanisms likely to be incorporated in the door, such as the door lock 4 with its remote control 6, the window regulator 5 with its cable return pulley 5¹ and its control handle shaft 5², etc. and possibly a welded frame in the case of a framed door.

The door hinges and the door retaining strap 3 may also be supported by this metal structure or, more advantageously, formed directly in the end portions 2 of this structure.

(2) A cellular or like coating or lining 8 of plastic or any other mouldable material, covered with a sheet or "skin" 9 constituting the inner finishing layer or upholstery, moulded over the X-shaped structure 12 and in which metal reinforcing elements such as 10 may be embedded to increase the stiffness of the coating.

However, an advantageous form of embodiment consists in utilising as a support for the cellular plastic or like coating a cardboard panel 7 covering the entire surface, and stiffening the edges, of the panel.

(3) The arm rest 13, which may be formed during the moulding of the inner upholstery or finishing layer 8 on the metal structure, this structure providing by means of suitably pressed, punched or otherwise properly shaped portions, the arm-rest support or bracket 13, the body and coating or lining of this arm-rest support or bracket 13 consisting of the same cellular or lamellar plastic materials constituting the body and skin of the inner upholstery or finishing layer 8.

(4) All the mechanisms set forth in paragraph (1) hereinabove and mounted beforehand on the X-shaped structure 12.

These two main elements (outer panel and inner assembly) are assembled by means of four fastening devices 11 (located one at each end of the X arms) and if necessary also by means of secondary or complementary fastening means (for assembling the upholstery with the outer panel).

This specific form of embodiment is based only on well-known and reliable industrial techniques permitting high rates of production.

It will be noted that the arrangement according to this invention permits not only a simple and economical manufacture but also a very easy mounting and removal of all the component elements of the door or like panel structure, even by unskilled hands. In fact, all the parts and mechanisms may be mounted on the X-shaped inner metal structure 12 to constitute a self-contained, homogeneous mechanical assembly adapted to be fitted into the door and secured therein by means of four screws located for example at 11.

Although the present invention has been described in conjunction with preferred embodiments, it is to be understood that modifications and variations may be resorted to without departing from the spirit and scope of the invention, those skilled in the art will readily understand. Such modifications and variations are considered to be within the purview and scope of the invention and appended claims.

I claim:

1. A panel structure comprising an outer wall of relatively thin material; and a prefabricated assembly over which said wall is fitted; said assembly comprising an inner metal structure extending from a point adjacent one end of said outer wall to a point adjacent the opposite end thereof, a plurality of auxiliary mechanisms mounted on said structure, and an inner wall of molding material in which said structure is embedded.

2. The panel structure of claim 1 wherein said outer wall has flanged edges which extend over said prefabricated assembly.

3. The panel structure of claim 1 wherein said metal structure is X-shaped and further comprising means to secure said outer wall over said metal structure.

4. The panel structure of claim 1 further comprising a plurality of rigid inserts embedded in said inner wall of molding material.

5. The panel structure of claim 4 wherein said inserts are pressed metal.

References Cited by the Examiner
UNITED STATES PATENTS

| | | |
|---|---|---|
| 1,920,816 | 8/1933 | Trautvetter. |
| 2,438,185 | 3/1948 | Prance _____ 296—31 X |
| 3,122,796 | 3/1964 | Woolley _____ 20—35 |
| 3,184,263 | 5/1965 | Plegat. |

BENJAMIN HERSH, *Primary Examiner.*

P. GOODMAN, *Assistant Examiner.*